United States Patent [19]

Kokado

[11] Patent Number: 4,733,277

[45] Date of Patent: Mar. 22, 1988

[54] APPARATUS FOR REPRODUCING INFORMATION FROM AN OPTICAL DISK

[75] Inventor: Hiroshi Kokado, Tokyo, Japan

[73] Assignee: Asahi Kogaku Kogyo Kabushiki Kaisha, Tokyo, Japan

[21] Appl. No.: 943,007

[22] Filed: Dec. 18, 1986

[30] Foreign Application Priority Data

Dec. 20, 1985 [JP] Japan .................. 60-285656

[51] Int. Cl.⁴ ............................................. G03B 27/52
[52] U.S. Cl. ........................................ 355/43; 355/55; 369/45
[58] Field of Search ....................... 355/43, 65, 66, 55; 356/126; 350/6.2, 433; 369/45

[56] References Cited

U.S. PATENT DOCUMENTS 3,833,769 9/1974 Compaan et al. .................... 369/45
4,525,625 6/1985 Abe ....................................... 369/455
4,633,455 12/1986 Hudson ................................. 369/45

Primary Examiner—Richard A. Wintercorn
Attorney, Agent, or Firm—Sughrue, Mion, Zinn, Macpeak & Seas

[57] ABSTRACT

An optical unit for focusing light on an optical disk in which laser light from a semiconductor laser is passed through a parallelpiped having a diffracting grating on its incident side before being focused on the optical disk. The angle, contained in the plane of the semiconductor laser's junction, between the grating's normal and the optical axis of the laser light is adjusted to a predetermined value.

6 Claims, 4 Drawing Figures

APPARATUS FOR REPRODUCING INFORMATION FROM AN OPTICAL DISK

BACKGROUND OF THE INVENTION

1. Field of the Invention

The present invention relates to an apparatus for reproducing information from an optical disk and, more particularly, to an improved optical unit for use in focusing laser light to form an image on the information recording surface of an optical disk.

2. Background of the Invention

A conventional apparatus for use in recording and reproducing information from an optical disk is described in Unexamined Published Japanese Patent Application Ser. No. 143443/1983. This apparatus uses an optical unit for focusing the laser light emitted from a semiconductor laser to form an image on the information recording surface of the disk. This optical unit is provided with a parallelepiped plate that allows the angle formed between a line normal to the laser light transmitting surface of the plate and the optical axis of the laser light to be varied within a plane containing the junction plane of the semiconductor laser.

The purpose of providing a parallelepiped plate is as follows. A semiconductor laser typically emits light along its p-n junction plane and the state of convergence of laser light within a plane containing the junction plane differs from that of convergence within a plane vertical to that plane. If no correction is taken, the laser light will cause astigmatism at the position where proper focusing should occur and the resulting distortion in the image of the beam spot precludes faithful reproduction of information. A parallelpiped plate is employed in order to avoid this problem.

In this instance, in order to achieve accurate scanning of laser light on the information recording surface of the disk, a diffraction grating must be disposed in the optical unit so that a tracking error signal is attained from the diffracted light.

As shown above, the image-forming optical unit in a conventional apparatus for recording and reproducing information from an optical disk requires a diffraction grating to be provided as a component separate from the parallelepiped plate. However, this places inevitable limitations on the effort to decrease the space occupied by the apparatus, and the number of components employed in great enough to increase the manufacturing cost of the apparatus.

SUMMARY OF THE INVENTION

The present invention has been accomplished in order to solve the aforementioned problems of the prior art system.

The invention has the following two characteristics. The image-forming optical unit is provided with a parallelepiped plate that is transparent to light from a semiconductor light and which has a diffraction grating on the transmitting surface on which the laser light is incident. Also, the optical axis of light from the semiconductor laser forms an angle within a plane containing the junction plane of the laser with respect to a line normal to the transmitting surface of the parallelepiped plate. This angle is adjusted to a predetermined value.

Light emerging from a semiconductor laser passes through the parallelepiped plate with a diffraction grating and forms an image on the information recording surface of an optical disk. Light reflected from the recording surface of the disk returns on the same optical path and is reflected from the parallelepiped plate to be fed into a photoelectric transducer unit. In this case, the angle the optical axis of laser light forms within a plane containing the junction plane of the laser relative to a line normal to the transmissive surface of the parallelepiped plate is adjusted to such an angle that the astigmatism which is inherent in laser light will not develop on the disk surface.

DETAILED DESCRIPTION OF THE PREFERRED EMBODIMENTS

The present invention is hereinafter described with reference to the embodiments shown in the accompanying drawings.

Figure 1:
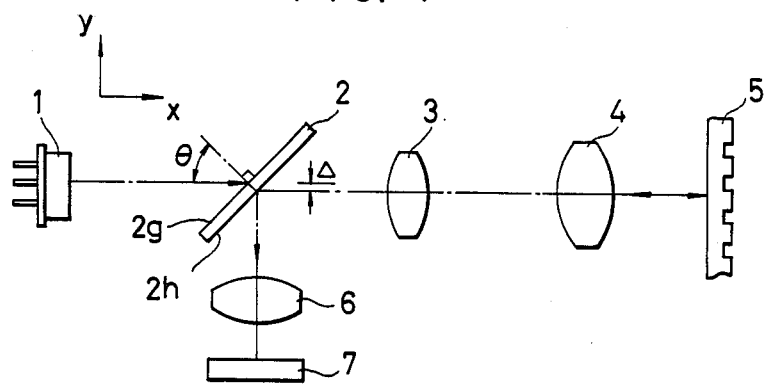
FIG. 1 is a schematic representation of an optical layout according to one embodiment of the present invention.

FIG. 1 is a schematic representation of an optical layout according to one embodiment of the present invention. A semiconductor laser 1 emits light whose optical axis is intercepted by a parallelepiped plate 2 with a diffraction grating. A collimator lens 3 and an objective lens 4 which are the other components of the image-forming optical unit are disposed ahead of the parallelepiped plate 2. The objective lens 4 is so positioned that it faces the information recording surface of an optical disk 5.

Figure 2:
FIG. 2 is a side view showing one embodiment of the parallelepiped plate with a diffraction grating used in the embodiment of FIG. 1.
Figure 3:
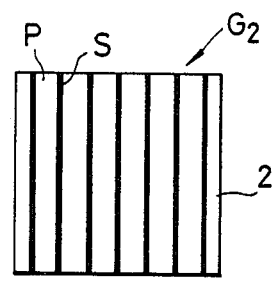
FIG. 3 is a plan view showing another embodiment of the parallelepiped plate.

The transmitting side $2g$ of the parallelepiped plate 2 on which laser light falls is provided with a phase-type diffraction grating $G_1$ having ridges and grooves formed as shown in FIG. 2. The grating may be of the amplitude type wherein light-transmissive areas P alternate with blocking areas S as shown in FIG. 3. The other transmitting side $2h$ of the plate 2 is provided with a half-mirror coating. The parallelepiped plate 2 has a predetermined thickness t and a refractive index n. A line normal to the transmitting surface $2g$ forms a predetermined angle $\theta$ with the optical axis of the laser light within a plane (the x-y plane in FIG. 1) containing the junction plane of the laser 1. The respective values of t, n and $\theta$ should be properly determined depending upon the amount by which it is necessary to correct any astigmatism which may be introduced into the image of a spot beam of laser light.

A relay lens 6 serving as the principal component of a focus detecting optical unit is disposed on the optical axis of the path along which the laser light travels after being reflected from the reflective surface $2h$ of the plate 2. This relay lens 6 forms an image at the position where a photoelectric transducer unit 7 is provided.

In the optical layout described above, when light from the semiconductor laser 1 passes through the parallelepiped plate 2, the grating on the transmitting surface $2g$ will act in such a manner that ±1st-order diffraction wavefronts for detection of any tracking error are produced while compensation for any astigmatism that has developed is achieved.

Laser light then passes through the collimator lens 3 to form parallel rays, which are transmitted through the objective lens 4 to form an image as a spot beam for reading information from the recording surface of the disk 5. Light reflected from the recording surface of the disk 5 is then passed through the objective lens 4 and collimator lens 3 to fall upon the reflective surface 2h of the parallelepiped plate 2. Since the reflective surface 2h has a half-mirror coating, a portion of the reflected light changes its direction to travel on a path that is perpendicular to the direction in which light from the laser 1 falls upon the transmitting surface 2g. The so reflected light is converged through the relay lens 6 to be focused at the photoelectric transducer 7 so as to enable information reproduction or tracking adjustment. Because of the refraction to which the laser light has been subjected during its passage through the inclined parallelepiped plate 2, the optical axis of the reflected light has been displaced parallel from the optical axis of the incident laser light by a predetermined amount Δ.

In the embodiment shown above, the reflective surface 2h is provided with a half-mirror coating. Alternatively, the reflective surface 2h may be provided with a polarizing coating which is combined with a quarter-wavelength plate to attain a desired polarizing effect.

Figure 4:
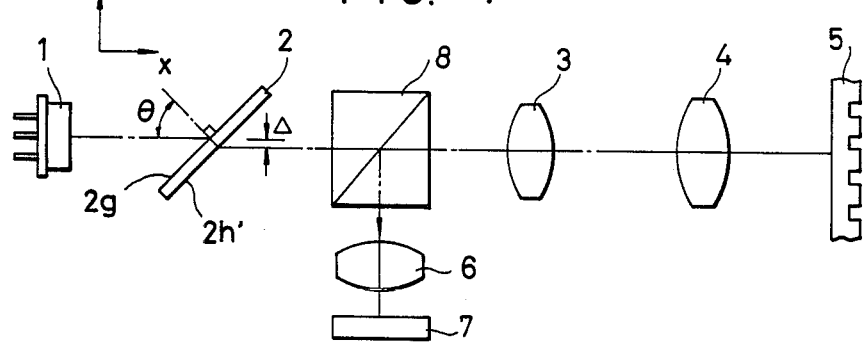
FIG. 4 is a schematic representation of an optical layout according to another embodiment of the present invention.

FIG. 4 shows another embodiment of the optical layout that may be employed in the present invention. The parallelepiped plate 2 used in this embodiment is generally transparent since it does not have any half-mirror coating or other forms of coating on a side 2h' which is opposite the transmitting side 2g having a diffraction grating. In addition, a beam splitter 8 is provided between the plate 2 and the collimator lens 3 as a means for changing the optical path of the light reflected from the disk surface 5. The other components of the embodiment shown in FIG. 4 are the same as those used in the layout of FIG. 1 and will not be explained in detail.

As described above, in accordance with the present invention, light emerging from a semiconductor laser is directed into an image-forming optical unit through a parallelepiped plate with a diffraction grating and the transmitted light is employed for the purpose of reproducing information from the recording surface of an optical disk. In this arrangement, a diffraction grating and a parallelepiped plate are formed into an integral body so that the overall size of the reproduction apparatus and, hence, its cost are reduced without impairing the detection capability of a tracking error signal. Yet, at the same time, the problem of astigmatism associated with the image of a spot beam of laser light can be solved.

What is claimed is:

1. An apparatus for reproducing information from an optical disk, comprising
    a semiconductor laser having a junction plane producing laser light;
    an image forming optical unit which focuses said laser light received along an optical axis from said junction plane to form an image on an information recording surface of an optical disk;
    a photoelectric transducer unit;
    a detecting optical unit which converges light reflected from said surface of said optical disk and directs said converged light to said photoelectric transducer unit; and
    a parallelepiped plate associated with said image forming optical unit passing said laser light and having a diffraction grating on a surface receiving said laser light, an angle within a plane containing said junction plane and formed between said optical axis and a normal to said receiving surface being adjusted to a predetermined value.

2. An apparatus according to claim 1, wherein said angle is greater than zero.

3. An apparatus according to claim 1, wherein the diffraction grating provided for the parallelepiped plate is a phase-type grating.

4. An apparatus according to claim 1, wherein the diffraction grating provided for the parallelepiped plate is an amplitude-type grating.

5. An apparatus according to claim 1, wherein said parallelepiped plate with a diffraction grating has a half-mirror coating on a surface which is opposite said receiving surface having the diffraction grating for reflecting light to said photoelectric transducer.

6. An apparatus for reproducing information from an optical disk, comprising:
    a semiconductor laser having a junction plane producing laser light;
    an image forming optical unit which focuses said laser light received along an optical axis from said junction plane to form an image on an information recording surface of an optical disk;
    a photoelectric transducer unit;
    a detecting optical unit which converges light reflected from said surface of said optical disk and directs said converged light to said photoelectric transducer unit; and
    a parallelepiped plate associated with said image forming optical unit passing said laser light and having a diffraction grating on a surface receiving said laser light, an angle within a plane containing said junction plane and formed between said optical axis and a normal to said receiving surface being adjusted to a predetermined value, said parallelepiped plate having a polarizing coating on a surface, which is opposite said receiving surface having the diffraction grating, for directing light to said photo-electric transducer.

* * * * *